Aug. 21, 1951 F. M. SCHMIDT 2,564,928

AMPLITUDE MODULATED TELEMETERING SYSTEM

Filed Jan. 24, 1947 3 Sheets-Sheet 1

INVENTOR.
Francis M. Schmidt
By: Moore, Olson & Trexler
Attys

Aug. 21, 1951 F. M. SCHMIDT 2,564,928

AMPLITUDE MODULATED TELEMETERING SYSTEM

Filed Jan. 24, 1947 3 Sheets-Sheet 2

INVENTOR.
Francis M. Schmidt
BY
Moore, Olson & Trexler
Attys.

AMPLITUDE MODULATED TELEMETERING SYSTEM

Filed Jan. 24, 1947 3 Sheets-Sheet 3

INVENTOR.
Francis M. Schmidt
BY
Moore, Olson & Trexler
attys

Patented Aug. 21, 1951 2,564,928

UNITED STATES PATENT OFFICE 2,564,928

AMPLITUDE MODULATED TELEMETERING SYSTEM

Francis M. Schmidt, North Tonawanda, N. Y., assignor to The Rudolph Wurlitzer Company, North Tonawanda, N. Y., a corporation of Ohio Application January 24, 1947, Serial No. 723,951

10 Claims. (Cl. 177—351)

This invention relates to data transmission systems, and particularly to radio telemetering systems.

The telemetering of instrument data or other functions over a radio link wherein physical changes at a transmitting position are faithfully reproduced or indicated at a remote receiving position involves problems not normally encountered in radio practice. Certain variable factors which may affect performance of the system are fluctuations of supply voltages at transmitter or receiver, variations of the degree of modulation at the radio transmitter and demodulation at the receiver, changes in the strength of signal from the transmitter and sensitivity of the receiver, and fading of the radio link.

An object of this invention is to provide an improved radio telemetering system to circumvent the aforesaid difficulties.

A further object of the invention is to provide a telemetering system embodying a novel method of modulation which insures that the demodulated signal amplitude at the receiving end is constant for a constant value of modulating signal amplitude at the transmitting end. I propose to accomplish this by amplitude-modulating a carrier signal in such a way as to maintain the peak amplitude of the carrier fixed at a predetermined value for all degrees of modulation up to 100 per cent, as opposed to the conventional method of amplitude modulation wherein the carrier peak amplitude increases as the percentage of modulation increases. At the receiving end of the system the carrier is amplified and the peak amplitude thereof is held constant so that the demodulated signal always bears the same relationship to this peak value as the modulating signal had to the stabilized unmodulated carrier peak at the transmitting end.

A still further object of the invention is to stabilize the peak carrier amplitude at both transmitting and receiving ends in a simple and effective manner, and for this purpose I provide voltage regulator means for the anode voltage supplies and also peak amplitude stabilizers, including diode-controlled feedback circuits, in association with the modulating and demodulating circuits of the system.

Various other objects, advantages and features of the invention will be apparent from the following specification when taken in connection with the accompanying drawings wherein a certain preferred embodiment is set forth for purposes of illustration.

In the present specification and appended claims, the terms "subcarrier" and "carrier" are used for convenience and without any intention to limit the invention thereby. In a broad sense, a subcarrier may be regarded as being a carrier with respect to the signal by which it is modulated.

Referring to the drawings, wherein like reference numerals refer to like parts throughout:

Figs. 1, 2 and 3, respectively are time-voltage diagrams or oscilloscope patterns of a subcarrier signal envelope under conditions when the subcarrier is unmodulated, modulated less than 100 per cent, and 100 per cent modulated, in accordance with the principles of the invention;

In the preferred embodiment of my invention herein disclosed I contemplate utilizing an amplitude-modulated subcarrier to frequency-modulate a radio carrier, the relative numerical value of the transmitted data being dependent upon the degree of modulation of the subcarrier. The peak amplitude A of this subcarrier is held substantially constant regardless of whether the subcarrier is unmodulated as in Fig. 1, partially modulated as in Fig. 2, or modulated 100 per cent as in Fig. 3. This type of amplitude modulation may be described as taking place "inwardly" from the fixed peak amplitude A. The absolute value of A is adjusted and fixed during design of the equipment to meet all of the operational requirements and bears no relation to any of the variables normally encountered in modulation, transmission, reception and demodulation.

Figures 1, 2, 3, 4, 5:
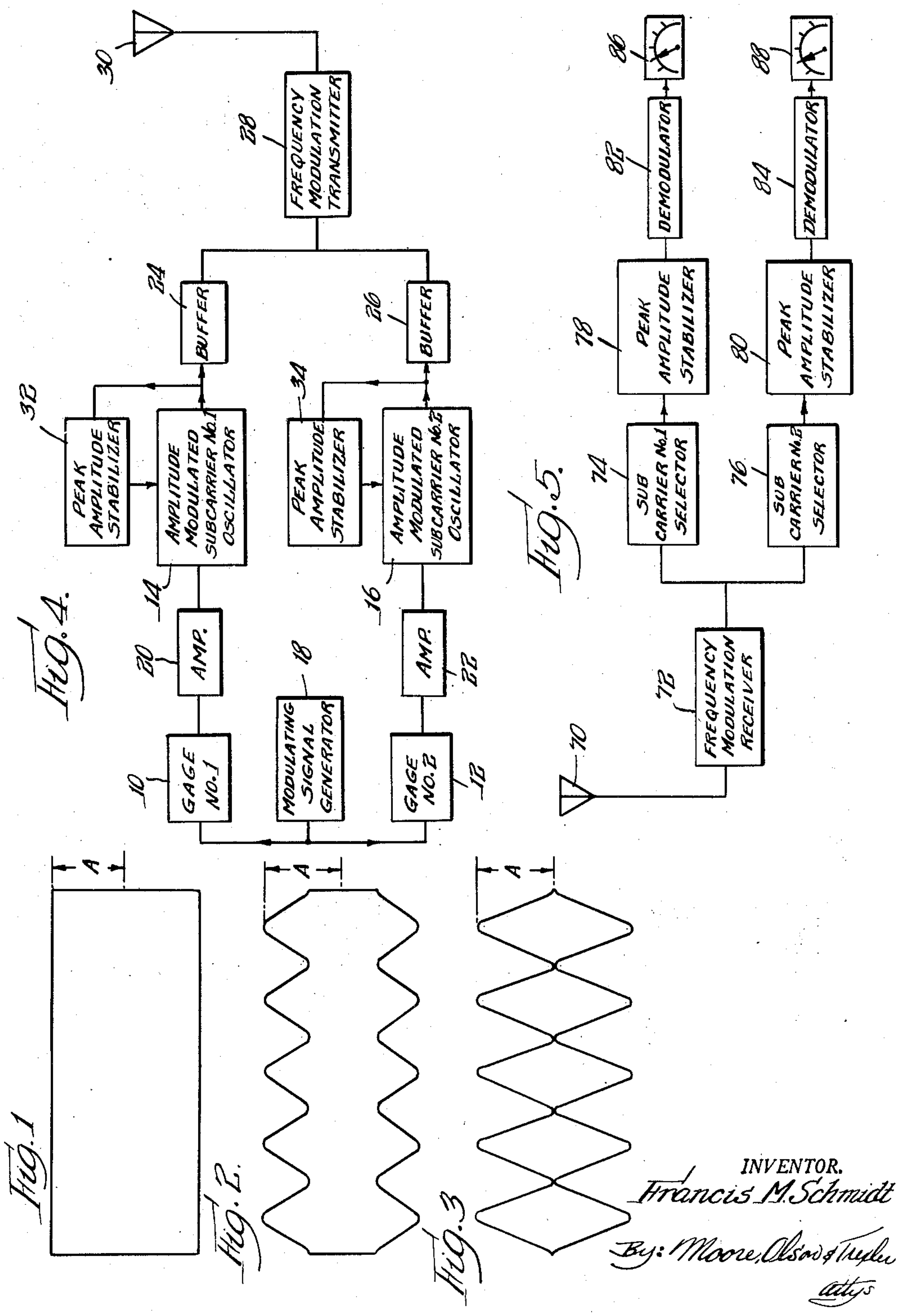
Fig. 4 is a block diagram of the transmitting section of the telemetering system.
Fig. 5 is a block diagram of the receiving section of the system.

Referring now to Fig. 4, the illustrated system is designed to accommodate two telemetering channels, although it will be understood that any desired number of channels may be provided in accordance with the principles of the invention. In each channel a transmitting instrument forming one element of a telemetering system, such as a gage 10 or 12 controls the modulation of a subcarrier generated by an oscillator as 14 or 16. The instruments 10 and 12 may, for example, constitute what are known as strain gage bridges employed on aircraft. An alternating-current signal, preferably at audio frequency, is furnished by a signal generator 18 to these bridges. The modulating voltage in the output of each gage 10 or 12 is amplified by an amplifier 20 or 22 and fed to the corresponding subcarrier oscillator 14 or 16 where it serves to amplitude-modulate the subcarrier. The subcarrier oscillators 14 and 16 are coupled through buffer stages 24 and 26 to the frequency-modulation transmitter 28. The frequency-modulated signal from the transmitter 28 is radiated from a transmitting antenna 30. A portion of the output of each subcarrier oscillator 14 or 16 is fed back through a peak amplitude stabilizer 32 or 34 to stabilize the peak subcarrier amplitude at a fixed value such as A.

Figure 6:
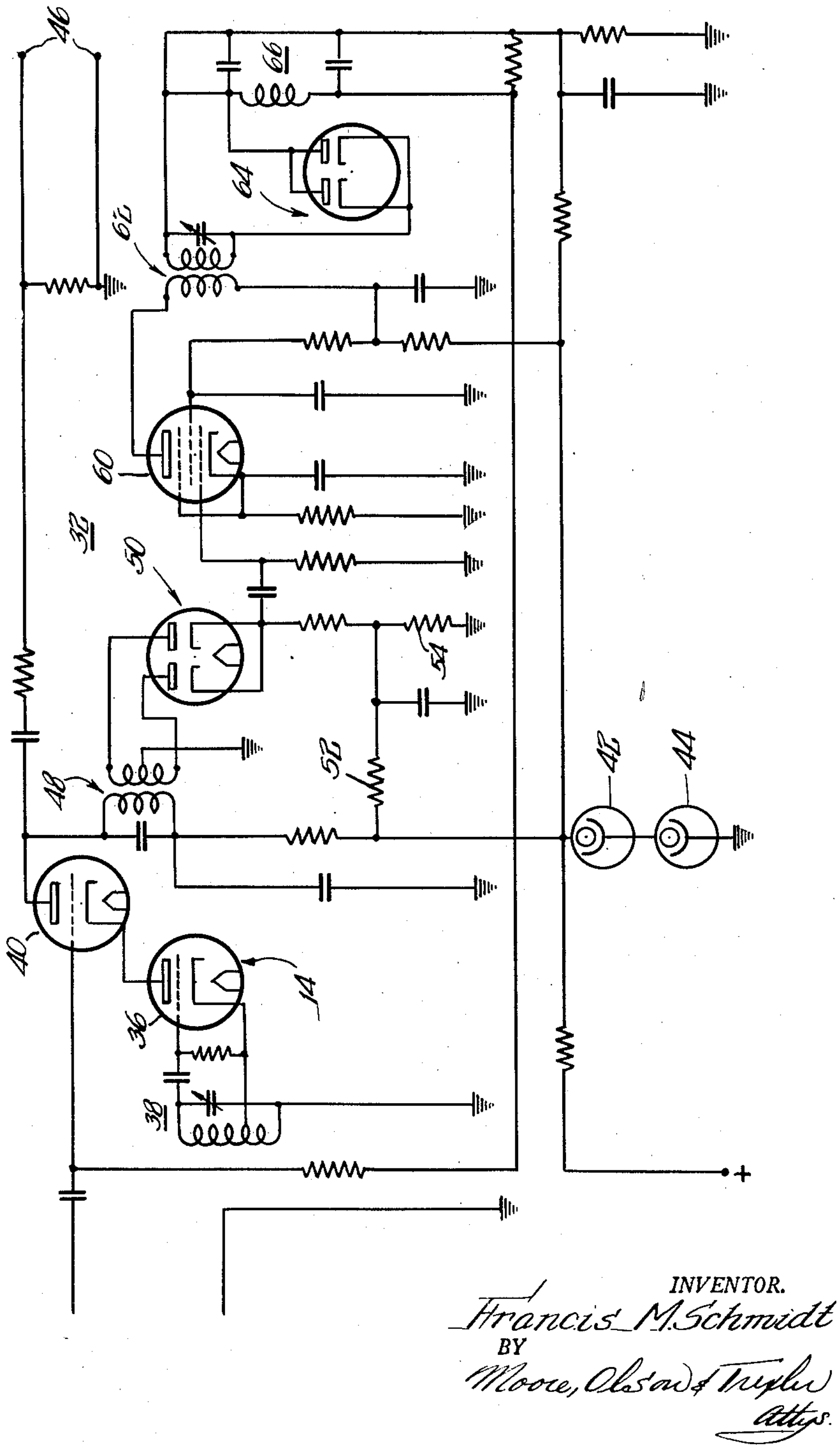
Fig. 6 is a schematic diagram showing a portion of the transmitting section.

The pertinent parts of the transmitting section are illustrated in greater detail in Fig. 6 for a single telemetering channel, such as the channel including the subcarrier oscillator 14. The triode 36 and associated tank circuit 38 generate subcarrier oscillations which are fed to the cathode of another triode 40 that functions as a modulator tube. The modulating signal from the amplifier 20, Fig. 4, is applied to the grid of tube 40. Anode voltage is supplied to the tube 40 from the series-connected voltage regulator tubes 42 and 44 which are in circuit with a suitable source of direct-current voltage (not shown). The anode of tube 40 is coupled by suitable means to the output terminals 46. If desired, the triodes 36 and 40 may be contained in a single envelope as in the dual triode type 6SL7.

The output of tube 40 is divided between the output circuit at terminals 46 and a tuned transformer 48 feeding a twin diode 50 having positively biased cathodes. This bias is obtained from a voltage divider comprising resistors 52 and 54 connected across the voltage regulator tubes 42 and 44. The twin diode 50 is similar to a full-wave rectifier and has a threshold determined by the positive cathode bias. Whenever the diode plate peak voltage exceeds this threshold, a control signal having a frequency twice that of the original subcarrier is produced and subsequently amplified by the amplifier tube 60 to which the twin diode is coupled. The output of tube 60 is fed through a tuned transformer 62 to a diode 64 which rectifies the control signal. A filter circuit 66 associated with the diode 64 produces a direct-current potential of varying value depending upon the peak modulated subcarrier amplitude. This potential is fed back as controlling bias to the grid of the modulator tube 40. Thus, within the limits determined by the gain characteristic of the control amplifier 60, the subcarrier peak amplitude is maintained constant at a value determined by the bias applied to the tube 50. Whenever the subcarrier peak voltage varies from the predetermined value, the controlling potential on the grid of the modulator tube 40 is adjusted to stabilize the peak carrier amplitude at the desired value A, Fig. 1, 2 or 3.

The result of the foregoing operation is that all modulation of the subcarrier takes place "inwardly," as shown by the patterns of Figs. 2 and 3. Controlled-amplitude subcarriers to the number needed are produced, mixed and used to modulate the frequency-modulation transmitter 28, Fig. 4. The modulating signal furnished by the signal generator 18 is stabilized in any suitable manner so that, in conjunction with the stabilized subcarrier peak amplitude, there is always a definite and unvarying relationship between the subcarrier peak and the peak modulating voltage for a given quantity registered by the transmitting instrument.

At the receiving end of the system, the signal is picked up by an antenna 70, Fig. 5, and passed through a frequency-modulation receiver 72 where the signal is demodulated to produce the amplitude-modulated subcarrier. This subcarrier signal is passed through subcarrier selectors, as 74 and 76, there being one such selector for each channel and each functioning to filter out its particular signal according to subcarrier frequency. A peak-amplitude stabilizer 78 or 80 fixes the peak value of the subcarrier at a constant value before allowing the signal to be fed to the demodulator 82 or 84, which extracts the audio-frequency signal for operating the receiving instrument or meter 86 or 88 constituting the operated element of the telemetering system.

Figure 7:
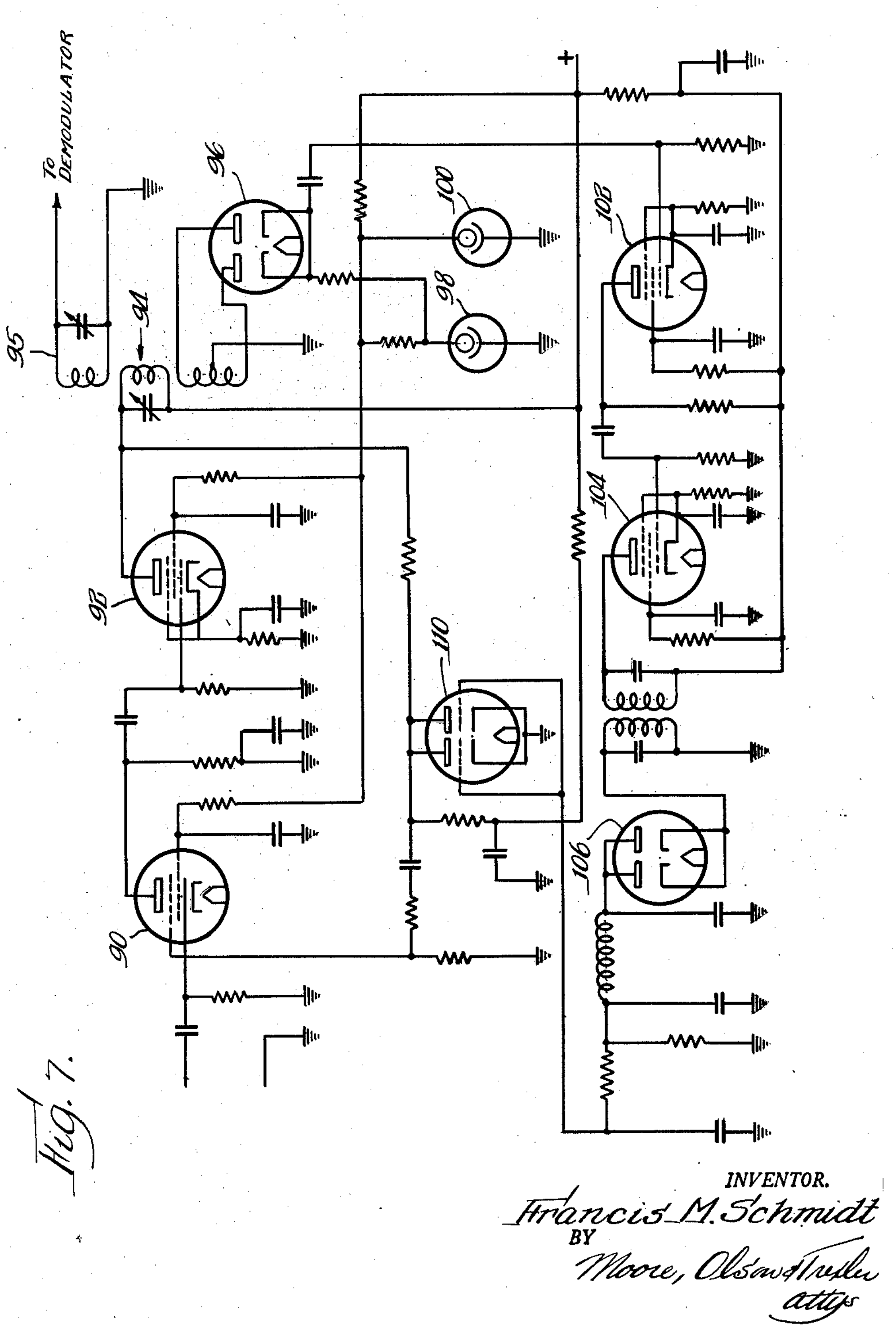
Fig. 7 is a schematic diagram showing a portion of the receiving section.

Referring now to Fig. 7, in which the selector and amplitude stabilizer of a single channel are illustrated, the incoming amplitude modulated subcarrier signal is fed to a two-stage, variable gain, inverse feedback amplifier including the tubes 90 and 92. The gain of the amplifier is such as to maintain an output level at least equal to the threshold value required when the input level drops to the minimum expected value. The output of tube 92 is passed through a tuned transformer 94 which selects the particular telemetering signal corresponding to the particular channel. On the secondary side of transformer 94 a portion of the output is fed through a tuned circuit 95 to a demodulator, such as the demodulator 82, Fig. 5, and the remainder of the output is delivered to a twin diode rectifier 96, Fig. 7. The cathodes of diode 96 are biased to a suitable positive potential by means of the voltage regulator tube 98. The voltage regulator tube 100 holds constant the screen voltages of the amplifier tubes 90 and 92 and also stabilizes the supply voltage for regulator tube 98 to improve its operation.

When the peak plate voltage of the diode 96 exceeds the bias, a signal having a frequency twice that of the original subcarrier is produced and amplified by the control amplifier containing tubes 102 and 104. The output of this amplifier is rectified by the diode 106 and subsequently filtered to produce a negative bias which is applied to the grids of a twin triode 110. The tube 110 serves as a feedback control tube, being shunted across the inverse feedback circuit between the plate of tube 92 and the cathode of tube 90. When peak carrier amplitude exceeds the predetermined value, there is a reduction of potential on the grids of tube 110 which tends to increase the shunting impedance afforded by this tube. This in turn causes the inverse feedback to be increased, thereby reducing the gain of the tube 90. The effect is to maintain the peak voltage to the demodulator at a constant value so long as the received subcarrier voltage stays within the operating limits of the equipment.

The method of telemetering using an inwardly modulated carrier signal as described herein, has the advantage that the peak amplitude of an amplitude-modulated carrier, which is readily stabilized at both transmitting and receiving ends of the system, serves as the basis for apportionment of modulating and demodulated signal amplitudes according to the relative values of transmitted data, thus insuring that the demodulated voltage at the receiving end has the same ratio to the carrier peak voltage as the modulating voltage at the transmitting end had to the peak amplitude of the carrier. This substantially eliminates the distortion heretofore commonly experienced in radio telemetering systems. The disclosed system is well adapted to multiple channel operation, as will be apparent to persons skilled in the art.

It is obvious that various changes may be made in the specific embodiment set forth for purposes of illustration without departing from the spirit of the invention. The invention is accordingly not to be limited to the specific embodiment shown and described, but only as indicated in the following claims.

The invention is hereby claimed as follows:

1. In a radio telemetering transmission system, means for generating a carrier signal, amplitude-modulating means for said signal, means for generating a modulating signal, means arranged for control by a telemetering transmitter selectively varying the amplitude of said modulating signal to control the amplitude-modulating means, and stabilizing means to maintain the peak to peak amplitude of the modulated carrier substantially constant at a predetermined value.

2. In a radio telemetering system, means for generating a carrier signal, amplitude-modulating means, means for generating a modulating signal, means arranged for control by a telemetering transmitter selectively varying the amplitude of said modulating signal substantially continuously, means controlling said modulating means to maintain substantially constant the peak to peak amplitude of the modulated carrier to produce inward modulation of said carrier signal by said modulating signal, transmitting means, a telemetering receiver, and receiving means including a peak to peak carrier amplitude stabilizer for operating said telemetering receiver.

3. In a radio telemetering system for transmitting data from a first instrument to a second instrument through a radio link, a subcarrier oscillator, a modulating signal generator, said first instrument controlling the output of said signal generator, a modulator responsive to said signal generator for amplitude-modulating the output of said subcarrier oscillator, a frequency-modulation transmitter, means for feeding the modulated output of said modulator to said frequency-modulation transmitter, a peak amplitude stabilizer responsive to the output of said modulator and controlling said modulator for maintaining the peak to peak subcarrier amplitude at a substantially constant value while the remainder of said subcarrier varies in amplitude with the output signal of said modulating signal generator, a frequency-modulation receiver for reconverting the signal received from said transmitter to an amplitude-modulated subcarrier signal, means stabilizing the peak to peak amplitude of said subcarrier signal at a substantially constant value, and means for demodulating the stabilized subcarrier signal, said second instrument being responsive to said demodulating means.

4. In a radio telemetering system, a carrier oscillator, a modulating signal generator, a telemetering transmitter instrument controlling said signal generator to adjust the output thereof in accordance with data to be transmitted, amplifying and modulating means having a gain control element and responsive to said signal generator for amplitude-modulating the output of said oscillator, peak to peak amplitude stabilizing means including feedback means responsive to the output of said amplifying and modulating means for controlling the potential of said control element, a transmitter coupled to said amplifying and modulating means, and a receiver responsive to said transmitter including a peak to peak amplitude stabilizer for the received carrier, said receiver being arranged to control a telemetering device to be actuated.

5. The combination set forth in claim 4, wherein said received carrier peak to peak amplitude stabilizer comprises a variable-gain amplifier, and feedback means for applying a portion of the output of said amplifier as controlling bias to the input stage of said amplifier, said feedback means including frequency altering means.

6. In a radio system for telemetering control functions from a transmitting instrument to an instrument controlling receiver, a telemetering transmitter system comprising a carrier oscillator, a modulating signal source controlled by said transmitting instrument, a modulator for amplitude-modulating said oscillator in response to said source, and feedback means coupling the output of said modulator to the input thereof and effective to adjust the average value of the modulated carrier for maintaining the peak to peak amplitude thereof substantially constant, said feedback means including therefor frequency multiplying means and frequency discriminating means.

7. In a radio system for telemetering control functions, a transmitter apparatus comprising a carrier oscillator, a modulating signal source controlled by a telemetering transmitting instrument, a modulator for amplitude-modulating said oscillator in response to said source, and feedback means coupling the output of said modulator to the input thereof and effective to adjust the average value of the modulated carrier for maintaining the peak to peak amplitude thereof substantially constant while the remainder of the carrier varies in response to the varying amplitude of said modulating signal source, and a receiver responsive to said transmitter apparatus and arranged to control an instrument to be operated, said receiver including a variable-gain amplifier for the amplitude-modulated received carrier, and feedback means coupling a portion of the output of said amplifier to the input thereof and effective to adjust the average carrier value for maintaining the peak to peak modulated carrier amplitude substantially constant, said receiver feedback means including a dual diode having a predetermined threshold potential.

8. In a radio telemetering system for transmitting data from a sending instrument to a receiver, a transmitter apparatus comprising a modulating signal source, said sending instrument controlling the output of said source, a subcarrier generator including an oscillator tube, a modulator tube in series with said oscillator tube and having a control grid responsive to the modulating signal from said source for amplitude-modulating the subcarrier furnished by said generator, a dual diode having a predetermined threshold voltage and adapted to be rendered conductive whenever the peak to peak output voltage of said modulator tube exceeds a predetermined value of peak subcarrier amplitude, means converting the output of said diode to a direct-current voltage the magnitude of which depends upon the excess of peak to peak subcarrier amplitude over the predetermined value thereof, means for applying the direct-current voltage as controlling bias to the grid of said modulator tube, and a frequency-modulation transmitter adapted to be modulated by the amplitude-modulated subcarrier from said modulator tube.

9. In a system as set forth in claim 8, a frequency-modulation receiver responsive to the frequency-modulation transmitter for reconverting the frequency-modulated carrier from said transmitter to an amplitude-modulated subcarrier, a variable-gain amplifier for amplifying the subcarrier, feedback means including a dual diode having a predetermined threshold voltage and adapted to be rendered conductive whenever the output voltage of said amplifier exceeds a fixed value of peak subcarrier amplitude, and means for converting the output of said diode to controlling bias for said variable-gain amplifier thereby to maintain the peak subcarrier amplitude substantially at said fixed value thereof, means for demodulating the subcarrier, and means for operating a telemetering instrument to be controlled by said system.

10. In a radio telemetering receiving system in which the associated transmitting system includes a carrier generator, a modulator operable in response to a telemetering data transmitter, and a source of modulating signal, means responsive to the amplitude of the modulated carrier for stabilizing the peak to peak carrier amplitude and means for demodulating said modulated carrier.

FRANCIS M. SCHMIDT.

REFERENCES CITED

The following references are of record in the file of this patent:

UNITED STATES PATENTS

| Number | Name | Date |
|---|---|---|
| 2,007,416 | Affel | July 9, 1935 |
| 2,212,568 | Kramar | Aug. 27, 1940 |
| 2,288,817 | Maggio | July 7, 1942 |
| 2,325,366 | Brown | July 27, 1943 |
| 2,402,598 | Charchian | June 25, 1946 |
| 2,444,950 | Nichols | July 13, 1948 |